(12) United States Patent  (10) Patent No.: US 8,560,616 B1
Diac et al.  (45) Date of Patent: Oct. 15, 2013

(54) IP MANAGEMENT FOR OUTBOUND E-MAILS

(75) Inventors: Paul F. Diac, Iasi (RO); Igor Spac, Iasi (RO)

(73) Assignee: Amazon Technologies, Inc., Reno, NV (US)

( * ) Notice: Subject to any disclaimer, the term of this patent is extended or adjusted under 35 U.S.C. 154(b) by 327 days.

(21) Appl. No.: 12/890,910

(22) Filed: Sep. 27, 2010

(51) Int. Cl.
*G06F 15/16* (2006.01)

(52) U.S. Cl.
USPC ............ 709/206; 709/229; 455/439; 370/466

(58) Field of Classification Search
USPC .................... 709/206, 229; 455/439; 370/466
See application file for complete search history.

(56) References Cited

U.S. PATENT DOCUMENTS

| | | | | |
|---|---|---|---|---|
| 7,206,814 B2* | 4/2007 | Kirsch | ........................... | 709/206 |
| 7,487,217 B2* | 2/2009 | Buckingham et al. | ........ | 709/206 |
| 7,756,930 B2* | 7/2010 | Brahms et al. | ................ | 709/206 |
| 7,890,627 B1* | 2/2011 | Thomas | ........................ | 709/224 |
| 7,899,866 B1* | 3/2011 | Buckingham et al. | ........ | 709/206 |
| 7,925,516 B2* | 4/2011 | McCann et al. | ............... | 705/1.1 |
| 8,224,905 B2* | 7/2012 | Bocharov et al. | ............. | 709/206 |
| 2005/0277418 A1* | 12/2005 | Singhal et al. | ................ | 455/439 |
| 2006/0168057 A1* | 7/2006 | Warren et al. | ................. | 709/206 |
| 2006/0179113 A1* | 8/2006 | Buckingham et al. | ........ | 709/206 |
| 2008/0208980 A1* | 8/2008 | Champan et al. | ............. | 709/206 |
| 2008/0225888 A1* | 9/2008 | Valluri et al. | ................. | 370/466 |
| 2009/0037469 A1* | 2/2009 | Kirsch | ....................... | 707/104.1 |
| 2009/0300720 A1* | 12/2009 | Guo et al. | ......................... | 726/3 |

* cited by examiner

*Primary Examiner* — Amare F Tabor
(74) *Attorney, Agent, or Firm* — Hope Baldauff, LLC

(57) ABSTRACT

Technologies are described herein for managing the IP addresses of outbound e-mail messages based on sender reputation. A range of reputation scores is divided into a number of reputation segments, each covering a span of the reputation scores. The available IP addresses are distributed evenly among the reputation segments. The span of reputation scores for each of the reputation segments may be periodically adjusted based on historical data regarding a volume of e-mail messages sent by sender reputation score. In order to select a source IP address for a particular outbound e-mail message, the reputation segment encompassing a sender reputation score regarding the sender of the e-mail message is determined. An IP address is selected from the IP addresses assigned to the reputation segment and returned to be utilized as the source IP address in sending the outbound e-mail message.

14 Claims, 5 Drawing Sheets

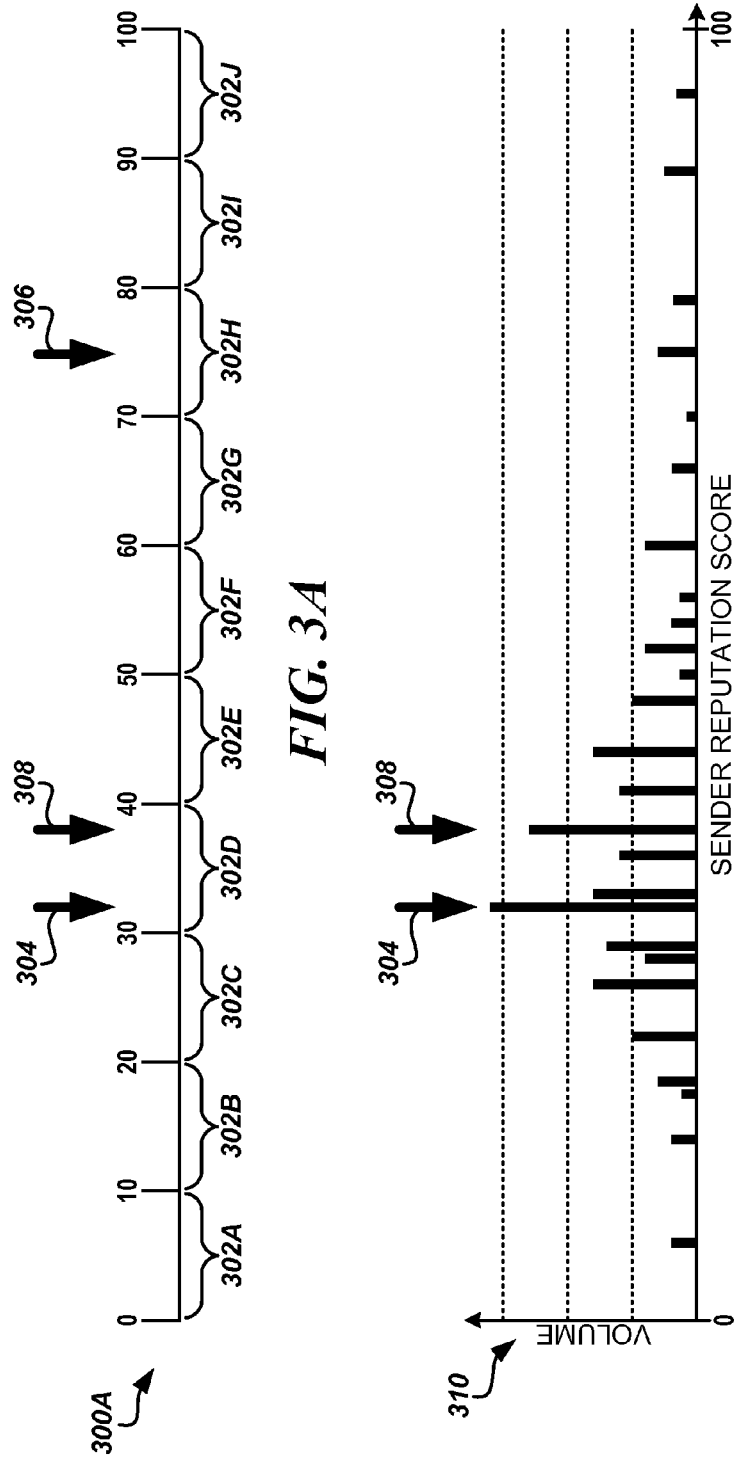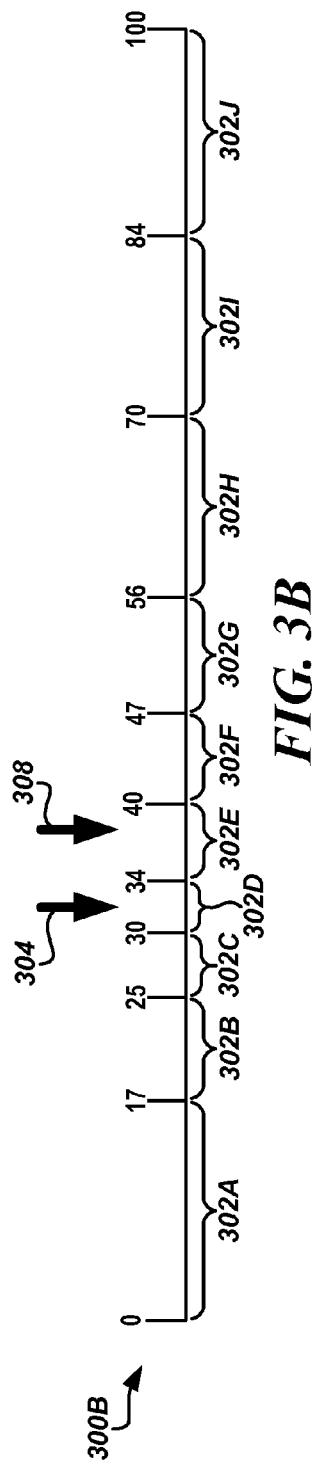
FIG. 3A
FIG. 3B

IP MANAGEMENT FOR OUTBOUND E-MAILS

BACKGROUND

A provider of e-mail services may process e-mail messages on behalf of many customers, or "senders," and forward the messages to specified recipients over the Internet. These e-mail messages may be sent across the Internet through a number of mail servers operating in the provider's e-mail delivery system, depending on the volume of e-mail messages being processed and the capacity of the mail servers. The mail server may utilize the domain name system ("DNS") to determine the remote mail system designated for the recipient's e-mail address and then utilize an e-mail protocol, such as the simple mail transport protocol ("SMTP"), to forward the e-mail message to the remote mail system.

In order to protect recipients from unsolicited junk or bulk e-mail, referred to herein as spam e-mail, the remote mail system may incorporate a variety of known anti-"spam" techniques to identify and mark such e-mails. Each e-mail message received by the remote mail system may be identified by both the sender's e-mail address as well as a source address, such as the Internet protocol ("IP") address of the mail server from which is was sent. As part of the implemented anti-spam techniques, upon detecting a threshold number of e-mail messages identified as spam e-mail, the remote mail system may begin to mark all e-mail from the mail server as spam e-mail based on the IP address from which the e-mail message was received.

Ultimately, the remote mail system may begin to block all e-mail messages received from the mail server at that IP address. In addition, the remote mail system may share the IP address of the offending mail server with other remote mail systems through the use of a "blacklist." Once blacklisted, a large number of remote mail systems may begin to mark all message from the IP address as spam e-mail or block all connections from the identified mail server. The actions of remote mail systems in regards to e-mail messages identified by an IP address may determine the "reputation" of the IP address. An IP address appearing on one or more blacklists or identifying a mail server used to send a large number of spam e-mails may be said to have a bad reputation. Conversely, an IP address not on a blacklist and/or considered benign by remote mail systems may have a good reputation.

A particular e-mail delivery system may have a limited number of IP addresses available for sending e-mail messages. In an e-mail delivery system supporting a large number of customers, many customers may share the same mail server(s) for outbound e-mails. If one customer sends a large number of spam e-mail messages, the IP address of the shared mail server may develop a bad reputation. This may affect how e-mail messages from other customers of the e-mail delivery system are regarded by remote mail systems, regardless of the content of their messages. A non-spamming customer may still find that their e-mail messages are blocked or marked as spam e-mail, even when the content of the messages is benign.

It is with respect to these and other considerations that the disclosure made herein is presented.

BRIEF DESCRIPTION OF THE DRAWINGS

FIGS. 3A and 3B are block diagrams showing the division of an IP address pool into reputation segments, according to embodiments presented herein;

DETAILED DESCRIPTION

Figure 1:
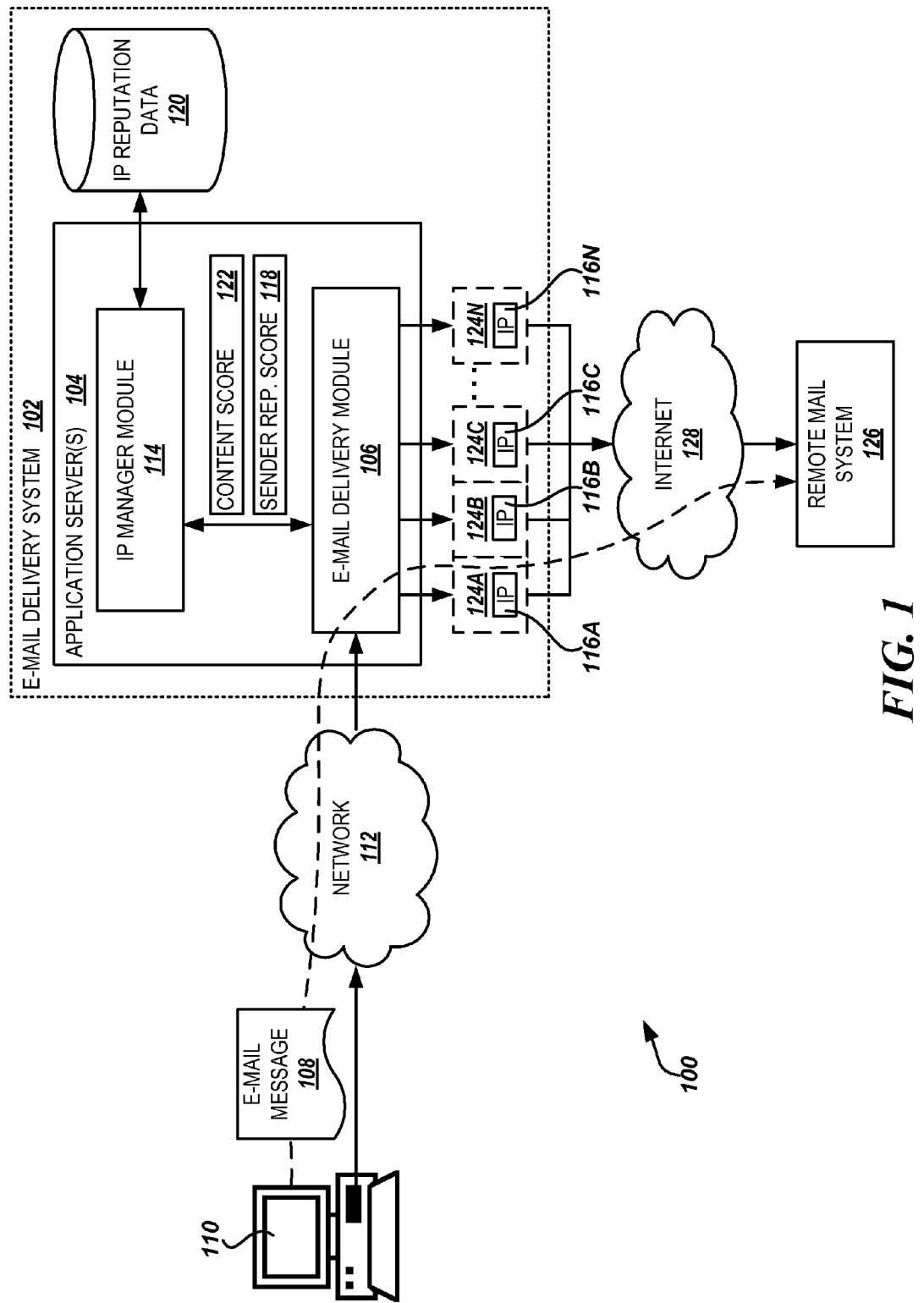
FIG. 1 is a system diagram showing aspects of an illustrative operating environment for managing the IP addresses of outbound e-mail messages, including several software and hardware components provided by embodiments presented herein.

The following detailed description is directed to technologies for managing the IP addresses of outbound e-mail messages based on sender reputation. Utilizing the technologies, described herein, the IP address to be utilized as the source address for an outbound e-mail message is selected from a pool of IP addresses available to an e-mail delivery system based on the reputation of the sender of the message. Selecting the IP address for outbound e-mail messages based on sender reputation effectively isolates senders with bad reputations, e.g. senders of unsolicited or "spam" e-mail, to a limited number of IP addresses from the pool of available IP addresses, thus limiting the potential effect of the actions of these senders on other customers of the e-mail delivery system. In addition, because senders are limited to a small number of IP addresses from which e-mail messages will be sent, the reputation of senders can be protected while allowing the e-mail delivery system to load-balance the volume of e-mail messages sent through the mail servers corresponding to the available IP addresses.

According to embodiments, a range of reputation scores is divided into a number of reputation segments, each covering a span of the reputation scores. The available IP addresses are distributed evenly among the reputation segments. The span of reputation scores for each of the reputation segments may be periodically adjusted based on historical data regarding a volume of e-mail messages sent by sender reputation score. In order to select a source IP address for a particular outbound e-mail message, the reputation segment encompassing a sender reputation score regarding the sender of the e-mail message is determined. An IP address is selected from the IP addresses assigned to the reputation segment and returned to be utilized as the source IP address in sending the outbound e-mail message.

It should be appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. More-over, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, cellular telephone devices, electronic-book readers, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief, general description of a suitable computing environment in which the embodiments described herein may be implemented. In particular, FIG. 1 is a system diagram that shows an illustrative operating environment 100 including several software components for implementing methods for managing the IP addresses of outbound e-mail messages based on sender reputation, according to embodiments provided herein. The environment 100 includes an e-mail delivery system 102. The e-mail delivery system 102 may be implemented and maintained by a provider of e-mail services, such as an Internet service provider ("ISP") or an e-mail application hosting company.

The e-mail delivery system 102 may include a number of application servers 104 that provide various e-mail services to the customers of the e-mail delivery system. The application servers 104 may execute a number of modules in order to provide the e-mail services to the customers. The modules may execute on a single application server 104 or in parallel across multiple application servers in the e-mail delivery system 102. In addition, each module may consist of a number of subcomponents executing on different application servers 104 or other computing devices in the e-mail delivery system 102. The modules may be implemented as software, hardware, or any combination of the two.

In one embodiment, an e-mail delivery module 106 executes on the application servers 104. The e-mail delivery module 106 is configured to receive an e-mail message 108 from a sending computer 110 over a network 112 and deliver the received e-mail message to the recipient(s) over the Internet. The e-mail message 108 may include a message header containing the information identifying the customer or sender of the message, such as a user ID or sender e-mail address, one or more recipient e-mail addresses, a subject for the message, a unique identifier for the message, and the like. The e-mail message 108 may further include a message body containing the contents of the message. The contents may include text, HTML, XML, or other multi-media content in multipurpose Internet mail extensions ("MIME") attachments, for example.

The sending computer 110 may be an application server 104 in the e-mail delivery system 102, a remote server computer, a personal computer ("PC"), a laptop, a notebook, a personal digital assistant ("PDA"), a wireless device, a cellular telephone, an electronic-book reader, a game console, a set-top box, a consumer electronics device, or any other computing device capable of connecting to the network 112. The network 112 may be a local-area network ("LAN"), a wide-area network ("WAN"), the Internet, or any other networking topology known in the art that connects the sending computer 110 to the e-mail delivery system 102.

According to embodiments, upon receiving the e-mail message 108 from the sending computer 110, the delivery module 106 contacts an IP manager module 114 executing on the application servers 104 to determine one of a number of IP addresses 116A-116N (referred to herein generally as IP address 116) that will be utilized as the source address for the e-mail message. In one embodiment, the e-mail delivery module 106 provides a sender reputation score 118 corresponding to the sender of the e-mail message 108 to the IP manager module 114. The sender reputation score 118 provides an indication of the reputation of the sender as seen by remote mail systems in regards to the character and quality of the e-mail activity of the sender. The sender reputation score 118 of a particular sender may be determined by cumulative data regarding the sender's e-mail activity, including content scores calculated for e-mail messages 108 sent by the sender; complaints received by recipients of e-mail messages sent by the sender, such as "Mark as Spam" operations in the recipients' e-mail client applications; e-mail messages sent by the sender that are returned as undeliverable; and the like.

The sender reputation score 118 may be provided by the sending computer 110 along with the e-mail message 108, or the e-mail delivery module 106 may lookup the sender reputation score from a database based on the information identifying the sender in the message header. As will be described below, the IP manager module 114 utilizes the sender reputation score 118 and IP reputation data 120 stored in the e-mail delivery system 102 to determine the IP address 116 to be utilized as the source address for the e-mail message 108. The IP reputation data 120 contains information regarding the reputation associated with each IP address 116 utilized by the e-mail delivery system 102, and may be stored in a data storage system of the e-mail delivery system, such as a database.

In another embodiment, the e-mail delivery module 106 also provides a content score 122 regarding the contents of the e-mail message 108 along with the sender reputation score 118 to the IP manager module 114. The content score 122 may represent the likelihood that the e-mail message 108 may be interpreted as spam e-mail by remote mail systems. The content score 122 may be provided by the sending computer 110 along with the e-mail message 108 or calculated by the e-mail delivery module 106 from the contents of the e-mail message utilizing any number of methods known in the art. The content score 122 may be utilized by the IP manager module 114 along with the sender reputation score 118 and the IP reputation data 120 to determine the IP address 116 to be utilized as the source address for the e-mail message 108, as will further be described below in regard to FIG. 4. Once the IP address 116 for the outbound e-mail message 108 has been determined, the IP manager module 114 provides the IP address to the e-mail delivery module 106.

The e-mail delivery module 106 then selects a mail server 124A corresponding to the provided IP address 116 from a group of mail servers 124A-124N through which to forward the e-mail message 108 to the recipient. The mail servers 124A-124N (referred to herein generally as mail server 124) may represent one or more virtual SMTP servers, each corresponding to one of the IP addresses 116A-116N and capable of delivering the e-mail message 108 to the recipient over the Internet. It will be appreciated that the mail servers 124 may be components of the e-mail delivery module 106, may execute on the same application servers 104 as the e-mail delivery module, or may be external to the e-mail delivery system 102. In addition, a number of mail servers 124 may be virtualized within a single executable module, with each mail server having its own IP address 116. The selected mail server 124A may then utilize DNS to determine the remote mail system 126 designated for each recipient e-mail address specified in the e-mail message 108 and forward the e-mail message to the remote mail system over the Internet 128.

Figure 2:
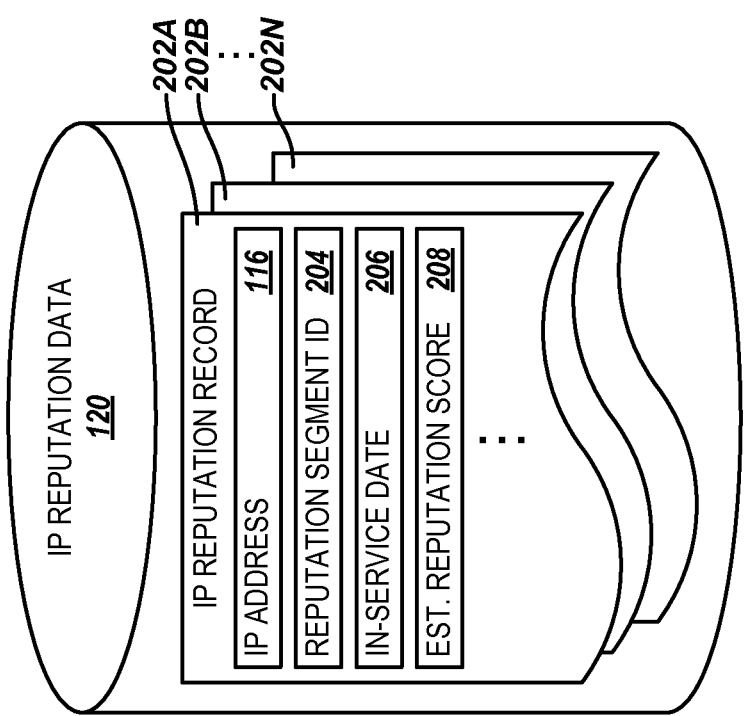
FIG. 2 is a data structure diagram illustrating a number of data elements maintained in IP reputation data regarding an IP address, according to embodiments presented herein.

FIG. 2 is a data structure diagram showing a number of data elements stored in a data structure. It will be appreciated by one skilled in the art that the data structure shown in the figure may represent a record stored in a database table, an object stored in a computer memory, a programmatic structure, or any other data container commonly known in the art. Each data element included in the data structure may represent one or more fields or columns of a database record, one or more attributes of an object, one or more member variables of a programmatic structure, or any other unit of data of a data structure commonly known in the art. The implementation is a matter of choice, and may depend on the technology, performance, and other requirements of the computing system upon which the data structures are implemented.

Specifically, FIG. 2 shows one example of data elements that may be stored in the IP reputation data 120. As described above, the IP reputation data 120 contains information regarding the reputation associated with each IP address 116 in the pool of IP addresses available to the e-mail delivery system 102. The IP reputation data 120 may contain an IP reputation record 202A-202N (referred to herein generally as IP reputation record 202) corresponding to each IP address 116. Each IP reputation record 202 contains the IP address 116 with which it is associated. The IP reputation record 202 may contain a reputation segment ID 204 identifying the reputation segment to which the associated IP address 116 belongs, as will be explained in more detail below in regard to FIGS. 3A and 3B. In addition, each IP reputation record 202 may contain an in-service date 206 indicating the date that the corresponding IP address 116 was added to the pool of available IP addresses. The in-service date 206 may be used in the seasoning of new IP addresses, as is described below in regard to FIG. 4.

In one embodiment, the IP reputation record 202 further contains an estimated reputation score 208. The estimated reputation score 208 may contain an estimate of the reputation of the IP address 116 as seen by remote mail systems. The IP manager module 114 and/or e-mail delivery module 106 may compute the estimated reputation score 208 for an IP address 116 based on the content scores 122 of e-mails sent from the address, from the occurrence of e-mails sent through the IP address that were returned as undeliverable, from indications that the IP address has been blocked by one or more remote mail systems, by the appearance of the IP address on one or more blacklists, and the like.

The estimated reputation score 208 may be utilized by the IP manager module 114 to change the assignment of an IP address 116 from one reputation segment to another, to return a blacklisted IP address to the appropriate reputation segment once it has been re-seasoned, or to re-season the IP address when the reputation score falls below a certain threshold, for example. It will be appreciated that the IP reputation record 202 may contain additional data elements beyond those shown in FIG. 2 and described above that represent reputation data regarding the IP address 116 and that are utilized by the IP manager module 114, the e-mail delivery module 106, and/or other modules of the e-mail delivery system 102.

As described above in regard to FIG. 1, the IP manager module 114 determines the IP address 116 to be utilized as the source address for the e-mail message 108 based, at least in part, on the sender reputation score 118 provided by the e-mail delivery module 106. FIGS. 3A and 3B and the following discussion provide additional details on the operation of the IP manager module 114. According to one embodiment, the IP manager module 114 distributes the pool of IP addresses 116A-116N from which to send e-mail messages among a number of reputation segments 302A-302J (referred to herein generally as reputation segment 302), each of the reputation segments corresponding to a span of reputation scores. For example, as shown in FIG. 3A, reputation scores may range from 0 to 100. The IP manager module 114 may divide the range of reputation scores into ten equally sized reputation segments 302A-302J, as shown in graph 300A. Specifically, reputation segment 302A corresponds to reputation scores from 0 to 10, reputation segment 302B corresponds to reputation scores from 10 to 20, reputation segment 302C corresponds to reputation scores from 20 to 30, and so on.

The IP manager module 114 then distributes the IP addresses 116A-116N from the pool of available IP addresses for sending e-mail messages equally among the reputation segments 302. For example, in the graph 300A shown in FIG. 3A, from a pool of fifty e-mail addresses 116A-116N, the IP manager module 114 may assign five IP addresses to each reputation segment 302. This may be accomplished by recording the index of the assigned reputation segment 302 in the reputation segment ID 204 of the IP reputation record 202 corresponding to the IP address 116 in the IP reputation data 120, for example. It will be appreciated that the IP manager module 114 may utilize fewer or more than ten reputation segments 302, and that the number of IP addresses 116 assigned to each reputation segment will vary based upon the total number of IP addresses in the pool of IP addresses.

According to one embodiment, in order to determine an IP address 116 for an outbound e-mail message 108, the IP manager module 114 selects from among the IP addresses assigned to the reputation segment 302 containing the sender reputation score 118 specified by the e-mail delivery module 106. For example, if the e-mail delivery module 106 specifies a sender reputation score 118 for a sender of 32, as indicated at 304 in FIG. 3A, the IP manager module 114 selects an IP address 116 from the IP addresses assigned to the reputation segment 302D covering reputation scores from 30 to 40. Similarly, if the e-mail delivery module 106 specifies a sender reputation score 118 of 75, as indicated at 306, the IP manager module 114 selects an IP address 116 from the IP addresses assigned to the reputation segment 302H covering reputation scores from 70 to 80.

The IP manager module 114 may select from the IP addresses 116 assigned to the target reputation segment 302 using a random selection function, a simple round robin algorithm, or some other method known in the art. The selection from within the reputation segment 302 may also vary according to the presence of IP addresses 116 being seasoned, as will be explained below in regard to FIG. 4. By isolating senders with poor reputation scores to a small number of the IP addresses 116 in the overall IP address pool, the IP manager module 114 may reduce or eliminate situations where the actions of one sender with a relatively bad reputation, such as the sender with the sender reputation score 118 of 32 described above, may affect the e-mails sent by a sender with a relatively good reputation, such as the sender with the sender reputation score of 75.

It will be appreciated that enforcing the segmentation of IP addresses 116 based on sender reputation score 118 in the manner described above may cause a situation in which a small portion of the mail servers 124 associated with the IP addresses 116 are handling a disproportionally large number of outbound e-mails, while other of the mail servers go relatively unutilized. For example, as may be seen in the exemplary graph 310 of e-mail volume by sender reputation score shown in FIG. 3B, two particular senders with relatively similar sender reputation scores 118, such as the senders with reputation scores of 32 and 38 represented in the figure at 304 and 308, respectively, may send the bulk of the e-mail messages 108 processed through the e-mail delivery system 102. In the initial reputation segment distribution described above in regard to FIG. 3A, these two senders would share the same five IP addresses 116 assigned to reputation segment 302D, and the mail servers 124 corresponding to these five IP addresses 116 would end up processing most of the e-mail messages 108 in the system.

To mitigate these circumstances, the IP manager module 114 may periodically recalculate the distribution of the reputation segments 302 based on historical data regarding the volume of e-mail messages sent by sender reputation score 118, as shown in the graph 310. In one embodiment, the IP manager module 114 periodically determines the volume of e-mail messages 108 sent for each individual sender reputation score ($V_i$) over some historical period. The length of historical period may depend on the frequency of recalculation of the distribution of the reputation segments 302, for example. The IP manager module 114 then calculates the average number of e-mails per reputation segment ($V_{avg}$) based on the total volume of e-mail messages 108 sent and the number of reputation segments 302A-302J. For example, the IP manager module 114 may use the following formula:

$$V_{avg} = \sum_{i=0}^{100} V_i \div \text{number of reputation segments}$$

Next, the upper and lower reputation bounds of the first reputation segment 302A are increased/decreased until the total volume of email messages 108 sent for individual sender reputation scores ($V_i$) encompassed by the segment is approximately equal to the calculated average ($V_{avg}$). In other words, the span of reputation scores covered by the reputation segment 302A is adjusted until:

$$\sum_{i=lower\ bounds}^{upper\ bounds} V_i \sim V_{avg}$$

The operation is repeated for all the remaining reputation segments 302B-302J to produce a new reputation segment distribution, such as that shown in the graph 300B of FIG. 3B.

Since each reputation segment 302 still has the same number of IP addresses 116 assigned, the IP addresses assigned to segments with narrower spans of reputation scores, such as reputation segment 302D, will be utilized by fewer senders with higher volumes of messages, while the IP addresses assigned to segments with wider spans of reputation scores, such as reputation segment 302I, will be utilized by a larger number of senders with lower volumes. Thus, the periodic recalculation of the distribution of the reputation segments 302 may result in isolating high volume senders, such as the senders indicated at 304 and 308 in FIG. 3B, to separate reputation segments 302D and 302D, and thus separate sets of IP addresses 116. This may have the effect of preventing the actions of a high volume e-mail sender from affecting the e-mail messages 108 of other senders utilizing the e-mail delivery system 102. In addition, the recalculation will provide load balancing of all the mail servers corresponding to the IP addresses 116 available to the e-mail delivery system 102.

Figure 4:
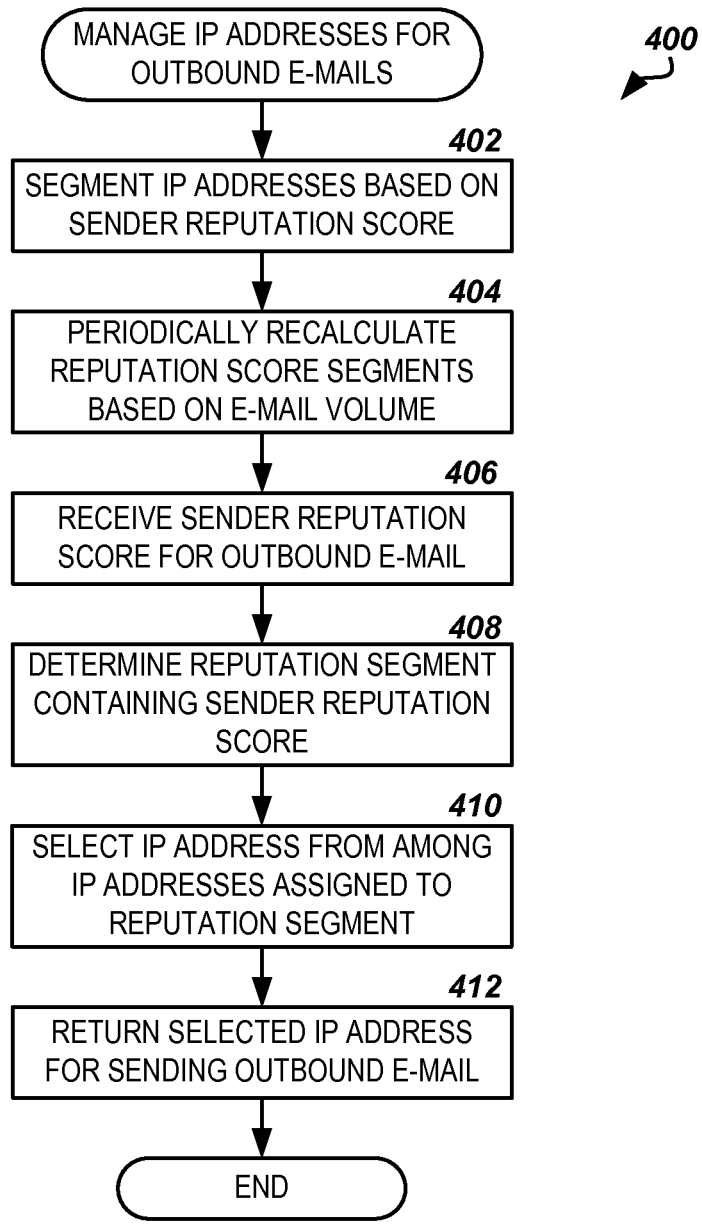
FIG. 4 is a flow diagram showing one method for managing the IP addresses of outbound e-mail messages based on sender reputation, according to embodiments described herein.

Turning now to FIG. 4, additional details will be provided regarding the embodiments presented herein for managing the IP addresses of outbound e-mail messages based on sender reputation. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 4 illustrates a routine 400 for managing IP addresses for outbound e-mail messages 108, according to embodiments described herein. In one embodiment, the routine 400 is performed by the IP manager module 114, as described above in regard to FIG. 1. It will be appreciated that the routine 400 may also be performed by the e-mail delivery module 106 or other modules or components executing on the application servers 104 in the e-mail delivery system 102, or by any combination of modules and components.

The routine 400 begins at operation 402, where the IP manager module 114 initially distributes the IP addresses 116A-116N from the pool of IP addresses amongst a number of reputation segments 302. As described above in regard to FIG. 3A, the IP manager module 114 may divide the range of sender reputation scores 118 into equally sized reputation segments 302 and assign an equal number of IP addresses 116 from the pool of available IP addresses to each of the reputation segments. This may be accomplished by recording an index to the assigned reputation segment 302 in the reputation segment ID 204 of the IP reputation record 202 corresponding to the IP address 116 in the IP reputation data 120, for example.

From operation 402, the routine 400 proceeds to operation 404, where the IP manager module 114 periodically recalculates the distribution of the reputation segments 302 based on historical data regarding the volume of e-mail messages sent by sender reputation score 118, as discussed above in regard to FIG. 3B. This may be done to mitigate situations where a small number of mail servers 124A-124N associated with the IP addresses 116 are handling a disproportionally large number of the outbound e-mail messages 108, as well as to effectively isolate high volume senders to their own set of IP addresses. In one embodiment, the recalculation of the distribution of the reputation segments 302 may occur once a day, taking into account the previous seven days' worth of historical data. This allows hour-by-hour variations in the sending patterns of senders utilizing the e-mail delivery system 102 to be accounted for, such as a sender that sends a high volume of e-mail at 3:00 am every weekday morning. It will be appreciated that other schedules and historical periods for recalculating the distribution of the reputation segments 302 may be utilized by the IP manager module 114, such as once an hour or once a week. It is intended that all such schedules and historical periods be included in the scope of this application.

The routine 400 proceeds from operation 404 to operation 406, where the IP manager module 114 receives a sender reputation score 118 corresponding to the sender of an outbound e-mail message 108. As described above in regard to FIG. 1, the IP manager module 114 may receive the sender reputation score 118 from the e-mail delivery module 106. The e-mail delivery module 106 may, in turn, receive the sender reputation score 118 from the sending computer 110 along with the e-mail message 108 to be sent, or the e-mail delivery module may lookup the sender reputation score from a database based on the information identifying the sender in the message header of the e-mail message. According to one embodiment, the IP manager module 114 utilizes the sender reputation score 118 to select the IP address 116 from the pool of IP addresses available to the e-mail delivery system 102 from which the e-mail message 108 will be sent.

As further described above in regard to FIG. 1, the IP manager module 114 may also receive a content score 122 from the e-mail delivery module 106 regarding the contents of the e-mail message 108 along with the sender reputation score 118. The content score 122 may be provided by the sending computer 110 along with the e-mail message 108 or calculated by the e-mail delivery module 106 from the contents of the e-mail message utilizing any number of methods known in the art. According to another embodiment, the IP manager module 114 utilizes both the content score 122 and the sender reputation score 118 to determine the IP address 116 from which to send the corresponding e-mail message 108. For example, the IP manager module 114 may allow a low content score 122 for a particular outbound e-mail message to override the sender reputation score 118 by utilizing the lesser of the content score and sender reputation score to determine the IP address 116 for sending the message.

From operation 406, the routine 400 proceeds to operation 408, where the IP manager module 114 determines the appropriate reputation segment 302 from which to select an IP address 116 based on the sender reputation score 118, or the lesser of the content score 122 and the sender reputation score, provided with the corresponding e-mail message 108. According to embodiments, the appropriate reputation segment 302 is the reputation segment having a span of reputation scores that includes the sender reputation score 118, as described above in regard to FIG. 3A.

The routine 400 then proceeds from operation 408 to operation 410, where the IP manager module 114 selects an IP address 116 from the IP addresses assigned to the reputation segment 302 determined in operation 408. As described above in regard to FIG. 3A, the IP manager module 114 may use a random selection function, a simple round robin algorithm, or some other method known in the art to select the IP address 116 from among the IP addresses assigned to the reputation segment. For example, the IP manager module 114 may maintain the index of the last IP address 116 selected for each reputation segment 302, and the next IP address may be selected on each subsequent outbound e-mail message 108 related to the reputation segment based on the maintained index. As further described above in regard to FIG. 3A, selection of the IP address 116 may also vary according to the presence of IP addresses being "seasoned." Seasoning of an IP address 116 allows newly allocated IP addresses to develop a baseline reputation before they are put into full service. This may be accomplished by both initially assigning the new IP address to a reputation segment 302 corresponding to moderate to good sender reputation scores 118 as well as limiting the volume of e-mail messages 108 sent from the IP address until the IP address is fully seasoned.

According to one embodiment, the IP manager module 114 automatically seasons new IP addresses 116 added to the e-mail delivery system 102 by maintaining an in-service date 206 for each IP address in the IP reputation data 120. When a particular IP address 116 elected by the round robin or other algorithm has an in-service date 206 less than a full seasoning period prior to the current date, the IP manager module 114 calculates a probability of selection for the candidate IP address based on its in-service date. For example, the IP manager module 114 may use an exponential probability function P(IP) such as:

$$P(IP)=e^{(age(IP)*C \div period)}$$

where age(IP) is the age of the candidate IP address 116 in seconds calculated from the in-service date 206 and the current date, period is the full seasoning period in seconds, and C is a constant such that the probability function P(IP) is bounded between 1 and 100.

The IP manager module 114 then utilizes the calculated probability of selection P(IP) and a uniformly distributed random number generator to determine whether the candidate IP address 116 is to be selected. If the candidate IP address 116 is not selected, the IP manager module 114 then elects the next IP address 116 from among the IP addresses assigned to the reputation segment 302 using the round robin or other algorithm, and the process is repeated until an IP address is selected. The routine 400 then proceeds from operation 410 to operation 412, where the IP manager module 114 returns the selected IP address 116 to the e-mail delivery module 106 for sending the outbound e-mail message 108. As discussed above in regard to FIG. 1, the e-mail delivery module 106 may then forward the e-mail message 108 to the mail server 124 corresponding to the selected IP address 116 for transmission to the remote mail system 126 for the recipient(s) over the Internet 128. From operation 412, the routine 400 ends.

Figure 5:
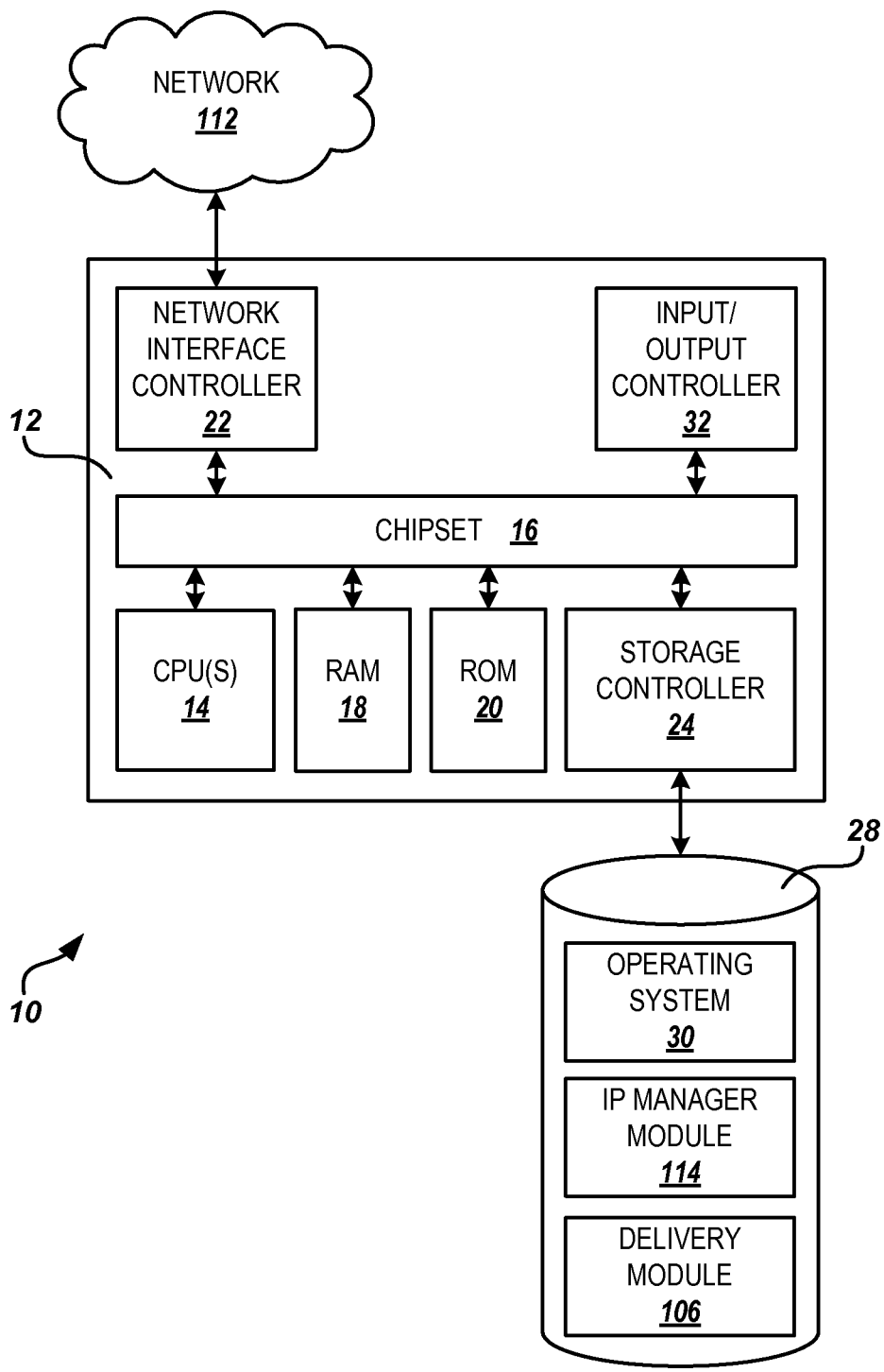
FIG. 5 is a computer architecture diagram showing an illustrative computer hardware architecture for computing devices described in embodiments presented herein.

FIG. 5 shows an example computer architecture 10 for a computer 12 capable of executing the software components described herein for managing the IP addresses of outbound e-mail messages based on sender reputation, in the manner presented above. The computer architecture 10 shown in FIG. 5 illustrates a conventional server computer, workstation, desktop computer, laptop, network appliance, personal digital assistant ("PDA"), electronic book reader, digital cellular phone, or other computing device, and may be utilized to execute any aspects of the software components presented herein described as executing on the application servers 104, sending computer 110, or other computing platform.

The computer 12 includes a baseboard, or "motherboard," which is a printed circuit board to which a multitude of components or devices may be connected by way of a system bus or other electrical communication paths. In one illustrative embodiment, one or more central processing units ("CPUs") 14 operate in conjunction with a chipset 16. The CPUs 14 are standard programmable processors that perform arithmetic and logical operations necessary for the operation of the computer 12.

The CPUs 14 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 16 provides an interface between the CPUs 14 and the remainder of the components and devices on the baseboard. The chipset 16 may provide an interface to a random access memory ("RAM") 18, used as the main memory in the computer 12. The chipset 16 may further provide an interface to a computer-readable storage medium such as a read-only memory ("ROM") 20 or non-volatile RAM ("NVRAM") for storing basic routines that help to startup the computer 12 and to transfer information between the various components and devices. The ROM 20 or NVRAM may also store other software components necessary for the operation of the computer 12 in accordance with the embodiments described herein.

According to various embodiments, the computer 12 may operate in a networked environment using logical connections to remote computing devices and computer systems through the network 112, such as a local-area network ("LAN"), a wide-area network ("WAN"), the Internet, or any other networking topology known in the art that connects the computer 12 to remote computers. The chipset 16 includes functionality for providing network connectivity through a network interface controller ("NIC") 22, such as a gigabit Ethernet adapter. The NIC 22 is capable of connecting the computer 12 to other computing devices over the network 112, such as other application servers 104, the sending computer 110, a data storage system in the e-mail delivery system 102, and the like. It should be appreciated that any number of NICs 22 may be present in the computer 12, connecting the computer to other types of networks and remote computer systems.

The computer 12 may be connected to a mass storage device 28 that provides non-volatile storage for the computer. The mass storage device 28 may store system programs, application programs, other program modules, and data, which are described in greater detail herein. The mass storage device 28 may be connected to the computer 12 through a storage controller 24 connected to the chipset 16. The mass storage device 28 may consist of one or more physical storage units. The storage controller 24 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 12 may store data on the mass storage device 28 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 28 is characterized as primary or secondary storage, and the like. For example, the computer 12 may store information to the mass storage device 28 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 12 may further read information from the mass storage device 28 by detecting the physical states or characteristics of one or more particular locations within the physical storage units.

In addition to the mass storage device 28 described above, the computer 12 may have access to other computer-readable storage medium to store and retrieve information, such as program modules, data structures, or other data. It should be appreciated by those skilled in the art that computer-readable storage media can be any available non-transitory media that may be accessed by the computer 12. By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 28 may store an operating system 30 utilized to control the operation of the computer 12. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The mass storage device 28 may store other system or application programs and data utilized by the computer 12, such as the e-mail delivery module 106 and the IP manager module 114, each of which was described above in regard to FIG. 1. In one embodiment, the mass storage device 28 or other computer-readable storage media may be encoded with computer-executable instructions that, when loaded into the computer 12, may transform the computer from a general-purpose computing system into a special-purpose computer capable of implementing the embodiments described herein. These computer-executable instructions transform the computer 12 by specifying how the CPUs 14 transition between states, as described above. According to one embodiment, the computer 12 may have access to computer-readable storage media storing computer-executable instructions that, when executed by the computer, perform the routine 400 for managing the IP addresses of outbound e-mail messages based on sender reputation, as described above in regard to FIG. 4.

The computer 12 may also include an input/output controller 32 for receiving and processing input from a number of input devices, such as a keyboard, the mouse, a touchpad, a touch screen, an electronic stylus, or other type of input device. Similarly, the input/output controller 32 may provide output to a display, such as a computer monitor, a flat-panel display, a digital projector, a printer, a plotter, or other type of output device. It will be appreciated that the computer 12 may not include all of the components shown in FIG. 5, may include other components that are not explicitly shown in FIG. 5, or may utilize an architecture completely different than that shown in FIG. 5.

Based on the foregoing, it should be appreciated that technologies for managing the IP addresses of outbound e-mail messages based on sender reputation are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A method for selecting an Internet protocol ("IP") address for sending an outbound e-mail message based on sender reputation, the method comprising executing instructions on one or more computers to perform the operations of:
dividing a range of reputation scores into a plurality of reputation segments, each reputation segment comprising a span of reputation scores;
assigning an equal number of IP addresses from a pool of IP addresses to each of the plurality of reputation segments;
periodically adjusting the span of reputation scores of one or more of the plurality of reputation segments based on historical data regarding a volume of e-mail messages sent by sender reputation score;
receiving a sender reputation score regarding a sender of the outbound e-mail message;
determining a reputation segment in the plurality of reputation segments having the span of reputation scores encompassing the received sender reputation score; and
selecting an IP address from the IP addresses assigned to the reputation segment to be utilized as a source IP address in sending the outbound e-mail message, wherein the selection is made using a random selection function or a round-robin algorithm.

2. The method of claim 1, wherein determining the reputation segment comprises determining the reputation segment in the plurality of reputation segments having the span of reputation scores encompassing a lesser of the received sender reputation score and a received content score regarding the contents of the outbound e-mail message.

3. The method of claim 1, wherein the selection is made using the round robin algorithm, and wherein the method further comprises:
determining whether the selected IP address is being seasoned;
upon determining that the selected IP address is being seasoned, calculate a probability of selection for the selected IP address based upon an in-service date of the IP address;
determine whether the selected IP address is to be utilized as the source address for the outbound e-mail message based on the calculated probability of selection;
upon determining that the selected IP address is to be utilized as the source address, return the selected IP address; and
upon determining that the selected IP address is not to be utilized as the source address, selecting a next IP address from the IP addresses assigned to the reputation segment based on the round-robin algorithm.

4. A non-transitory computer-readable storage medium having computer-executable instructions stored thereon that, when executed by a computer, cause the computer to:
divide a range of reputation scores into a plurality of reputation segments, each reputation segment comprising a span of reputation scores;
assign an equal number of IP addresses from a pool of IP addresses to each of the plurality of reputation segments;
adjust the span of reputation scores of one or more of the plurality of reputation segments periodically based on historical data regarding a volume of e-mail messages sent by sender reputation score;
receive a sender reputation score regarding a sender of an outbound e-mail message;
determine a reputation segment in the plurality of reputation segments having the span of reputation scores encompassing the received sender reputation score; and
select an IP address from the IP addresses assigned to the reputation segment to be utilized as a source IP address in sending the outbound e-mail message, wherein the selection is made using a random selection function or a round-robin algorithm.

5. The non-transitory computer-readable storage medium of claim 4, wherein the range of reputation scores is initially divided into the plurality of reputation segments having equal spans of reputation scores.

6. The non-transitory computer-readable storage medium of claim 4, wherein determining the reputation segment comprises determining the reputation segment in the plurality of reputation segments having the span of reputation scores encompassing a lesser of the received sender reputation score and a received content score regarding the content of the outbound e-mail message.

7. The non-transitory computer-readable storage medium of claim 4, wherein the selection is made using the round-robin algorithm, and wherein the computer-readable storage medium has further computer-executable instructions stored thereon that cause the computer to:
determine whether the selected IP address is being seasoned;
upon determining that the selected IP address is being seasoned, calculate a selection probability for the selected IP address based upon an in-service date of the IP address;
determine whether the selected IP address is to be utilized as the source address for the outbound e-mail message based on the calculated selection probability;
upon determining that the selected IP address is to be utilized as the source address, return the selected IP address; and
upon determining that the selected IP address is not to be utilized as the source address, selecting a next IP address from the IP addresses assigned to the reputation segment based on the round-robin algorithm.

8. A system for managing IP addresses for outbound e-mail messages in an e-mail delivery system, the system comprising:
one or more application servers;
an e-mail delivery module executing on the application servers and configured to receive an outbound e-mail message and to forward the e-mail message to a mail server for delivery of the e-mail message based on a source IP address; and
an IP manager module executing on the application servers and configured to divide a range of reputation scores into a plurality of reputation segments, each reputation segment comprising a span of reputation scores, assign an equal number of IP addresses from a pool of IP addresses available in the e-mail delivery system to each of the plurality of reputation segments, adjust the span of reputation scores of one or more of the plurality of reputation segments periodically based on historical data regarding a volume of e-mail messages sent by sender reputation score;

receive a sender reputation score regarding a sender of the outbound e-mail message and a content score regarding the contents of the outbound e-mail message from the e-mail delivery module, determine a reputation segment in the plurality of reputation segments having the span of reputation scores encompassing a lesser of the received sender reputation score or the received content score, select an IP address from the IP addresses assigned to the reputation segment as the source IP address for the outbound e-mail message using a random selection function or a round-robin algorithm, and return the selected IP address to the e-mail delivery module.

9. The system of claim 8, wherein the range of reputation scores is initially divided into the plurality of reputation segments having equal spans of reputation scores.

10. The system of claim 8, wherein the IP manager module is further configured to season a newly added IP address to the pool of IP addresses by limiting a volume of e-mail messages sent with the newly added IP address as the source address based on an in-service date of the newly added IP address indicating when the newly added IP address was added to the pool of IP addresses.

11. A method for managing IP addresses for outbound e-mail messages in an e-mail delivery system, the method comprising:

selecting an IP address as a source address for each of the outbound e-mail messages from among a pool of IP addresses available to the e-mail delivery system based on a sender reputation score regarding a sender of the outbound e-mail message and an in-service date associated with each IP address in the pool of IP addresses indicating when the IP address was added to the pool of IP addresses, wherein selecting an IP address from the pool of IP addresses as a source address for an outbound e-mail message comprises:

dividing a range of reputation scores into a plurality of reputation segments, each reputation segment comprising a span of reputation scores, dividing a range of reputation scores into a plurality of reputation segments, the plurality of reputation segments having equal spans of reputation scores, assigning a number of IP addresses from the pool of IP addresses to each of the plurality of reputation segments, periodically adjusting the span of reputation scores of one or more of the plurality of reputation segments based on historical data regarding a volume of e-mail messages sent by sender reputation score, determining a reputation segment in the plurality of reputation segments having the span of reputation scores encompassing the sender reputation score, and select an IP address from the lip addresses assigned to the reputation segment to be utilized as the source IP address for the outbound e-mail message.

12. The method of claim 11, wherein selecting the IP address from the IP addresses assigned to the reputation segment comprises selecting a next IP address from the IP addresses based on a round-robin algorithm.

13. The method of claim 11, wherein selecting an IP address from the pool of IP addresses as a source address for an outbound e-mail message is based upon a lesser of the sender reputation score and a content score regarding the contents of the outbound e-mail message.

14. The method of claim 11, wherein selecting an IP address from the pool of IP addresses as a source address for an outbound e-mail message based on the in-service date associated with each IP address in the pool of IP addresses comprises:

detecting that the IP address suggested as the source address for the outbound e-mail message is a new IP address based upon the in-service date associated with the IP address;

upon detecting that the new IP address has been suggested, calculate a probability of selection for the new IP address based upon the in-service date associated with the new IP address;

determine whether the new IP address is to be utilized as the source address for the outbound e-mail message based on the calculated probability of selection;

upon determining that the new IP address is to be utilized as the source address, return the new IP address; and upon determining that the new IP address is not to be utilized as the source address, suggest a next IP address from the pool of IP addresses to be utilized as the source address for the outbound e-mail message.

* * * * *